(12) United States Patent
Brown

(10) Patent No.: US 8,103,646 B2
(45) Date of Patent: Jan. 24, 2012

(54) AUTOMATIC TAGGING OF CONTENT BASED ON A CORPUS OF PREVIOUSLY TAGGED AND UNTAGGED CONTENT

(75) Inventor: Robert I. Brown, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 514 days.

(21) Appl. No.: 11/717,266

(22) Filed: Mar. 13, 2007

(65) Prior Publication Data
US 2008/0228749 A1    Sep. 18, 2008

(51) Int. Cl.
*G06F 17/30* (2006.01)
(52) U.S. Cl. ........ 707/705; 707/706; 707/708; 707/709; 707/710; 707/769; 707/771; 707/776; 707/777; 707/778
(58) Field of Classification Search ............... 707/3, 7, 707/705, 706, 708, 709, 710, 769, 771, 776, 707/777, 778
See application file for complete search history.

(56) References Cited

U.S. PATENT DOCUMENTS

| | | | |
|---|---|---|---|
| 5,649,060 A | 7/1997 | Ellozy et al. | |
| 6,006,241 A | 12/1999 | Purnaveja et al. | |
| 6,332,144 B1 | 12/2001 | deVries et al. | |
| 6,418,424 B1 | 7/2002 | Hoffberg et al. | |
| 7,035,803 B1 | 4/2006 | Ostermann et al. | |
| 2002/0131511 A1 | 9/2002 | Zenoni | |
| 2002/0194188 A1 | 12/2002 | Ostermann et al. | |
| 2004/0090462 A1* | 5/2004 | Graham | 345/767 |
| 2004/0199494 A1* | 10/2004 | Bhatt | 707/3 |
| 2005/0055321 A1* | 3/2005 | Fratkina et al. | 706/45 |
| 2005/0131559 A1* | 6/2005 | Kahn et al. | 700/94 |
| 2006/0149558 A1* | 7/2006 | Kahn et al. | 704/278 |
| 2006/0242554 A1* | 10/2006 | Gerace et al. | 715/501.1 |
| 2007/0078832 A1* | 4/2007 | Ott et al. | 707/3 |
| 2007/0106508 A1* | 5/2007 | Kahn et al. | 704/235 |
| 2007/0112630 A1* | 5/2007 | Lau et al. | 705/14 |
| 2007/0130112 A1* | 6/2007 | Lin | 707/2 |
| 2007/0179968 A1* | 8/2007 | Fish | 707/102 |
| 2007/0288514 A1* | 12/2007 | Reitter et al. | 707/104.1 |
| 2008/0021963 A1* | 1/2008 | Jana et al. | 709/206 |

(Continued)

FOREIGN PATENT DOCUMENTS

| | | |
|---|---|---|
| EP | 1079313 A3 | 10/2005 |
| WO | WO0122729 A1 | 3/2001 |
| WO | WO0208948 A3 | 9/2003 |

OTHER PUBLICATIONS

Adams, et al., "IBM Research TREC-2002 Video Retrieval System", http://www-24.nist.gov/projects/t2002v/results/notebook.papers/ibm.smith.pdf.

(Continued)

*Primary Examiner* — Thanh-Ha Dang

(57) ABSTRACT

An automated mechanism of automatically tagging media files such as podcasts, blog entries, and videos, for example, with meaningful taxonomy tags. The mechanism provides active (or automated) assistance in assigning appropriate tags to a particular piece of content (or media). Included is a system for automatic tagging of audio streams on the Internet, whether from audio files, or from the audio tracks of audio/video files, using the folksonomy of the Internet. The audio streams may be provided by the media author. For example, the author can make a recording to be posted on a website, and use the system to automatically suggest (via prompted author interaction) folksonomically appropriate tags for the media recording. Alternatively, the system can be used in an automated fashion to develop and assign without any intervention by the author.

19 Claims, 14 Drawing Sheets

U.S. PATENT DOCUMENTS

| | | | |
|---|---|---|---|
| 2008/0040674 A1* | 2/2008 | Gupta | 715/745 |
| 2008/0069480 A1* | 3/2008 | Aarabi et al. | 382/305 |
| 2008/0082416 A1* | 4/2008 | Kotas et al. | 705/14 |
| 2008/0086688 A1* | 4/2008 | Chandratillake et al. | 715/719 |
| 2008/0097970 A1* | 4/2008 | Olstad et al. | 707/3 |
| 2008/0104032 A1* | 5/2008 | Sarkar | 707/3 |
| 2008/0114644 A1* | 5/2008 | Frank et al. | 705/14 |
| 2008/0125892 A1* | 5/2008 | Hoguet | 700/98 |
| 2008/0154949 A1* | 6/2008 | Brooks et al. | 707/103 R |
| 2008/0201348 A1* | 8/2008 | Edmonds et al. | 707/101 |
| 2008/0255837 A1* | 10/2008 | Kahn et al. | 704/235 |
| 2009/0287674 A1* | 11/2009 | Bouillet et al. | 707/5 |

OTHER PUBLICATIONS

Jaimes, et al., "Semi-automatic, data-driven construction of multimedia ontologies", Date: 2003, http://ieeexplore.ieee.org/iel5/8655/27433/01221034.pdf?isNumber=.

Smith, et al., "Integrating Features, Models, and Semantics for TREC Video Retrieval", http://www.scils.rutgers.edu/~muresan/IR/TREC/Proceedings/t10_proceedings/papers/IBM-TREC-VIDEO-2001.pdf.

* cited by examiner

AUTOMATIC TAGGING OF CONTENT BASED ON A CORPUS OF PREVIOUSLY TAGGED AND UNTAGGED CONTENT

BACKGROUND

Semantic tagging and indexing is a popular way of organizing information, especially on the Internet. For example, tags are used extensively for blog postings, product catalogs (e.g., of book sellers), and photo collections. Audio recordings are also becoming more popular as an information medium, with Internet momentum gaining around podcasting, audio books, and video. The taxonomy used for tagging this content is not pre-defined and is evolving in an ad-hoc fashion, following popular trends, for example. The popular taxonomy can be referred to as "folksonomy".

There are practical problems with tagging this type of content. Knowledge of the current state of the folksonomy relies heavily on intuition. It is difficult to know exactly what types of tags are appropriate for a piece of data without guessing and searching to validate the guess. If an appropriate tag for user content is intuitively obvious to other people, but not to the user, then the user may not use it and other people will have difficulty finding the user content, if finding the content at all.

Common tools for recording audio and/or video content (e.g., telephones and cameras) are not good text input devices, and do not lend to easily attaching textual tags to content. Hence, a significant amount of audio and/or video content may go untagged if posted from these devices.

Audio and video content is oftentimes large in file size and should be reviewed serially at or near actual speed (or a small multiple thereof, such as double or triple speed) by a human in order to tag appropriately. This can lead to content not being tagged or to only portions of the content being reviewed, and hence, the tags not representative of the content as a whole.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture facilitates an automated mechanism of automatically tagging media files such as audio recordings containing spoken word (e.g., podcasts), blog entries, and videos, for example, with meaningful taxonomy tags. The architecture provides active (or automated) assistance in assigning appropriate tags to a particular piece of content (or media).

In one specific implementation, the architecture includes a system for the automatic tagging of audio streams on the Internet, whether from audio files or from the audio tracks of audio/video files, using the folksonomy of the Internet. The audio streams may be provided by the media author. For example, the author can make a recording to be posted on a website, and use the system to automatically suggest (via prompted author interaction) folksonomically appropriate tags for the media recording. Alternatively, the system can be used in an automated fashion to develop and assign a tag without any intervention by the author.

The system searches and receives the media (e.g., audio stream) into a recognition (e.g., automatic speech recognition (ASR) for automatic transcribing audio into text) processor for recognition. In the context of one form of media such as associated with audio processing, an ASR process is driven by a model of language and acoustic characteristics. The resulting text is not expected to be perfectly accurate, but at least an adequate representation of what was received (or voiced). For optimum performance, the ASR process should be resilient to background noise, music, sound effects, and provide separation or discrimination processing in the presence of multi-voice environments.

The system then forwards the transcribed text to a classifier that uses a tag classification model to produce a short list of tags that have a likelihood of being appropriate or related to the transcribed text. The accuracy of the tag classifier is maintained by utilizing a crawler, for example, to locate textual content that has already been tagged. The text and corresponding tag are input into a tag model trainer, which updates the tag classification model. The crawler can look for audio content, as well as audio/video content that have already been tagged. Additionally, the classifier can consider the source of the content, such as the specific authors or sites from which the content was obtained.

The author can then peruse the short list of likely tags and select the tag(s) desired. Alternatively, if the automated process is independent of author involvement, the classifier can implement a confidence threshold to reduce the likelihood of an inappropriate tag being selected.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
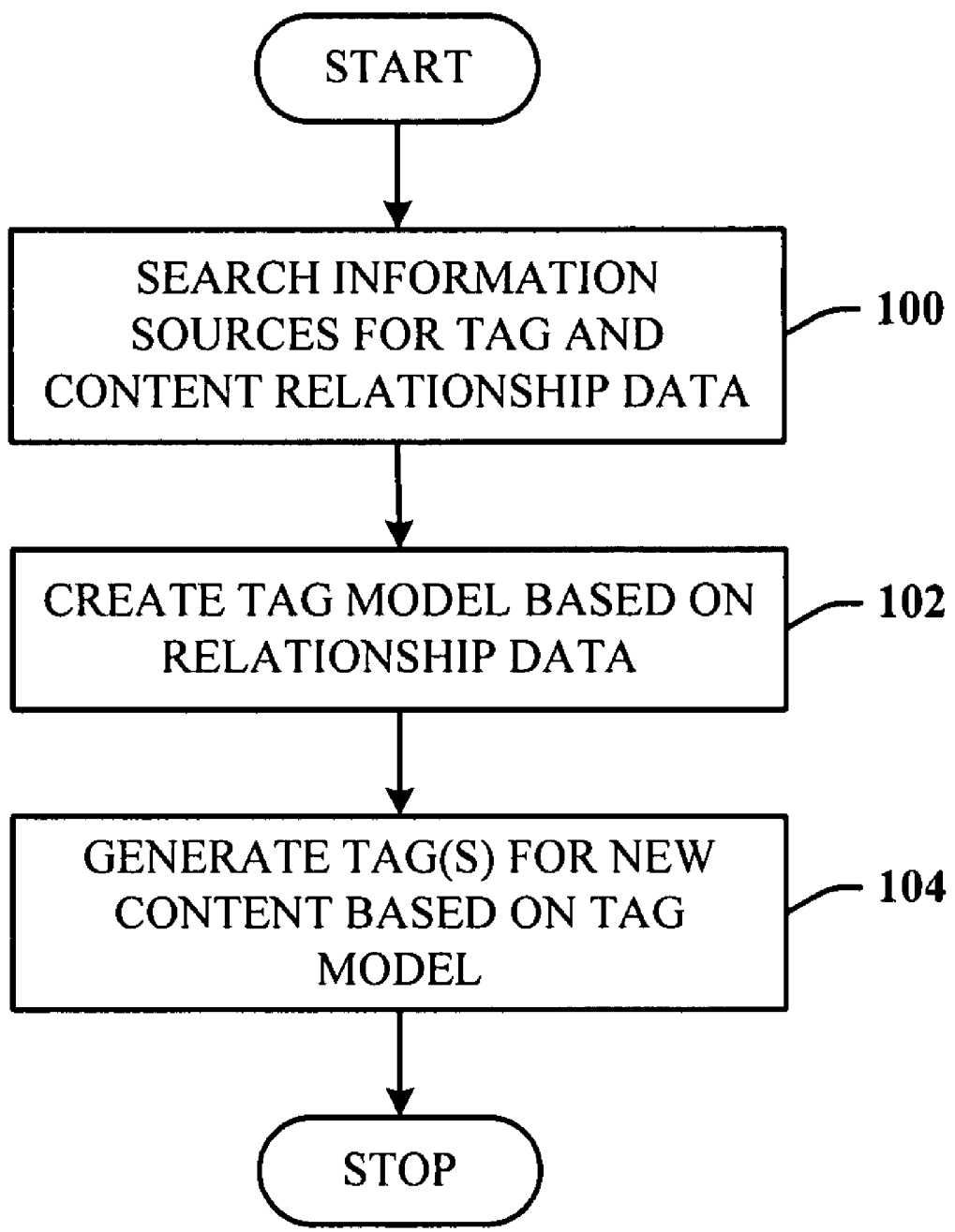
FIG. 1 illustrates a method of managing information in accordance with a novel embodiment.

The disclosed architecture facilitates a mechanism for automatically tagging media files such as podcasts, blog entries, and videos, for example, with meaningful taxonomy tags. Additionally, models are generated that can also be trained to provide a greater likelihood that the generated tags are relevant to the new content to be tagged. The system can be configured to allow a user to be involved in the selection process or not involved. Although used throughout the description as a file that can be tagged, a podcast is one form of audio recording that contains speech or spoke words. Accordingly, it is intended that tagging applies to all forms of audio files that can contain speech or spoken word.

The architecture includes means for searching entities or information sources (e.g., web sites, blogs) for tagged and/or untagged content from which to develop one or more models. The searches in accordance with various embodiments described herein can be performed as Internet searches as well as searches within an intranet (e.g., a search of information stored on a remote desktop computer or within a corporate network). Additionally, in more robust implementations, searches can be conducted down to the device-level. For example, local desktops or more local computing systems can be capable of hosting web sites (e.g., home networks, enterprise subnets). Accordingly, the disclosed architecture can be employed on a local computing system, alternatively or in combination with server systems.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Referring initially to the drawings, FIG. 1 illustrates a method of managing information using modeling and tagging. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

At 100, a search is performed for and on information sources (e.g., Internet-based, intranet-based) for tag and content relationship data. At 102, a tag model is created based on the relationship data. At 104, one or more tags for new content are generated based on the tag model.

Figure 2:
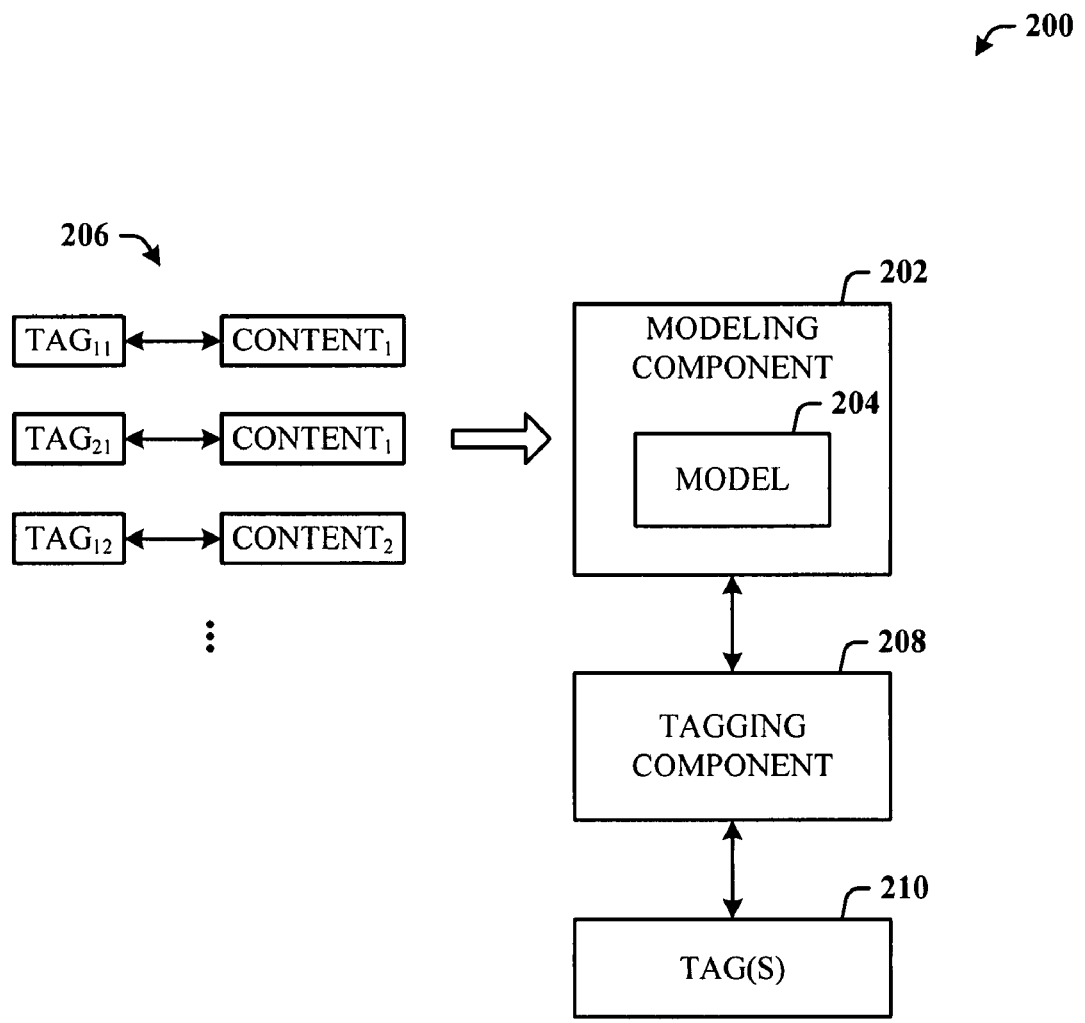
FIG. 2 illustrates a computer-implemented system that facilitates information management using modeling and tagging.

FIG. 2 illustrates a computer-implemented system 200 that facilitates information management using modeling and tagging. The system 200 includes a modeling component 202 for generating a model 204 of relationship data (or taxonomy) 206 between tags (denoted TAG) and an associated corpus of tagged content (denoted CONTENT). The tagged content can be media such as text, audio data, video data, or a combination thereof. As illustrated, there can be more than one tag (e.g., $TAG_{11}$ and $TAG_{21}$, represented as first and second tags (first subscript) for the first content (second subscript)) for the same content (e.g., $CONTENT_1$). The system 200 can further comprise a tagging component 208 for automatically generating one or more tags 210 for new content based on taxonomy employed in creating the model 204.

In a more specific implementation, the system 200 automatically tags audio data searched from devices and systems disposed on the Internet, whether from audio files, streaming audio, and/or from audio tracks of audio/video files, using the folksonomy of the Internet. As defined herein, folksonomy is associated with a network-based information retrieval technique consisting of collaboratively generated, open-ended tags (or labels) that categorize content such as web pages, image media (e.g., photographs, videos), and web links, for example. A folksonomy can be contrasted with a taxonomy in that with folksonomy, the authors of the tagging system are oftentimes the main users (and sometimes originators) of the tagged content. Folksonomy is typically employed in network-based environments such as intranets, for example, for creating and using tags on media such as photographs, blogs, papers, and websites. Unlike taxonomy, folksonomy has no authoritative body. Thus, the modeling component 202 is integral for modeling and the tagging process.

As indicated above, the audio data may be provided by the author. For example, the author can make a recording to be posted on the Internet, and use the disclosed architecture to suggest folksonomically appropriate tags for the recording. This is particularly beneficial when the author lacks sufficient knowledge of current folksonomy, and/or when the author does not have convenient access to a text-entry tool to enter the tags (e.g., the user is making the recording over an interactive voice response (IVR) system, an answering machine, voicemail system, or many other types of voice recording systems or recorded information). Alternatively, or in combination therewith, the architecture can be used in an automated fashion by tagging content without any intervention by the author.

Continuing with the audio example, and which is described in greater detail infra, the architecture receives and then feeds the audio data into an automatic speech recognition (ASR) process to transcribe the audio into text. The ASR process is driven by a model of language and acoustic characteristics. The resulting text does not need to be perfectly transcribed, but at least a decent representation of the content of the audio media. In a more robust implementation, the ASR process can be sufficiently discriminatory to background noise, music, sound effects, and the presence of more than one person speaking.

The transcribed text can then be passed into a classifier that uses a tag classification model to produce a short list of tags that are most likely to be appropriate to the transcribed text. The author can then peruse the short list of likely tags, and select those to apply. Alternatively, if the system is configured to operate independent of selection input by the author, the classifier can implement a confidence threshold to reduce the likelihood of an inappropriate tag being selected.

Figure 3:
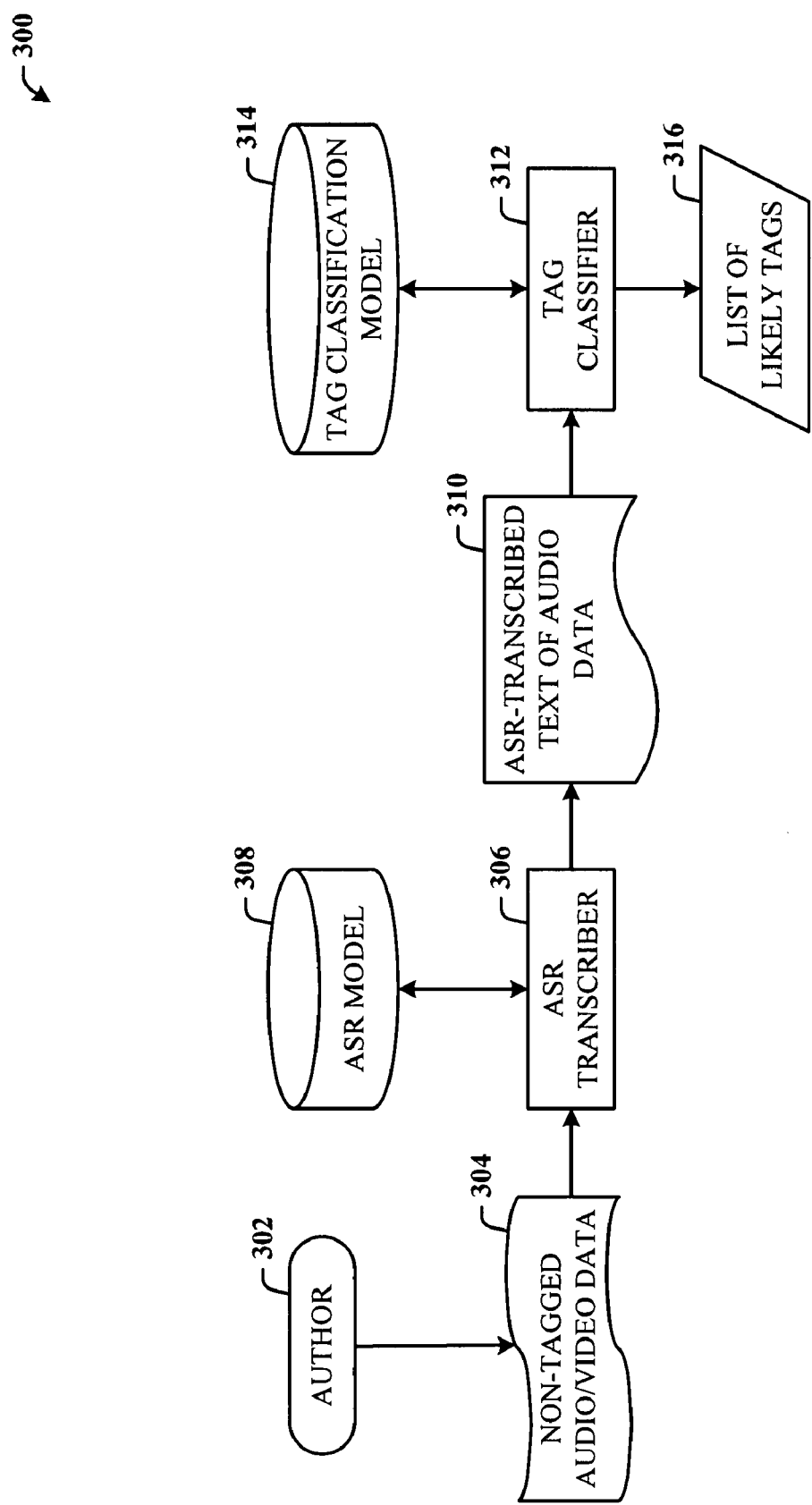
FIG. 3 illustrates a system for media recognition and tagging where the media is audio data.

FIG. 3 illustrates a system 300 for media recognition and tagging where the media is audio data. An author 302 creates the non-tagged (or untagged) audio data (e.g., file, streaming) 304 which can also include a channel of audio data that typically accompanies video content. The audio portion of the data 304 is input to an ASR transcriber 306 for processing the audio into digital data, and thereafter, converting the digital data into text.

In support thereof, an ASR data model 308 is provided for converting the digital portion of the audio data into text. The transcribed text 310 is then sent to a tag classifier 312 for applying probabilistic and/or statistical analysis to the transcribed text 310 in order to classify the text for tagging. A tag classification model 314 is generated and evolves as tag processing continues. Based on the received transcribed text 310, the tag classifier 312 obtains tag information from the tag model 314 and outputs the tag information as a list of likely tags 316. The list 316 can be presented to a user (e.g., the author 302) via a user interface, for example. The author 302 can then select from the list 316 a tag for use in tagging the audio and/or video data 304. Alternatively, the tag classifier 312 can include selection functionality that automatically prioritizes (or ranks) and selects the tag for associating with the audio and/or video data. The classifier 312 can be configured to implement a confidence threshold to reduce the likelihood of an inappropriate tag being selected.

Figure 4:
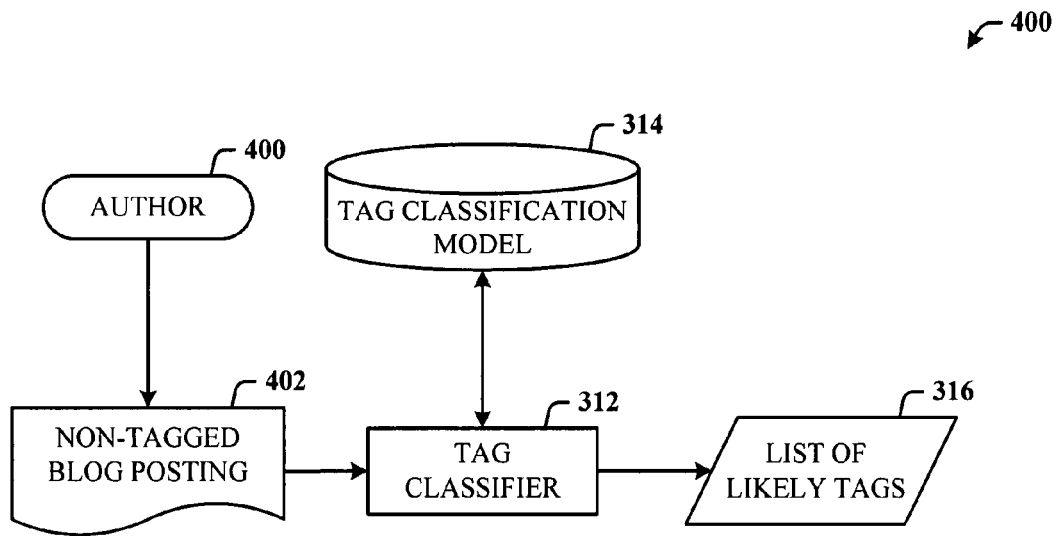
FIG. 4 illustrates a system for media recognition and tagging where the media is blog posting data.

FIG. 4 illustrates a system 400 for media recognition and tagging where the media is blog posting data 402. An author 400 creates the untagged blog posting data 402, which is then forwarded to the tag classifier 312. This assumes that the blog posting data 402 is text. As before, the tag classifier 312 obtains tag information from the tag classification model 314 and outputs the tag information as the list of likely tags 316. The list 316 can be presented to a user (e.g., the author 302) via a user interface, for example. The author 302 can then select from the list 316 a tag for the use in tagging the blog posting data 402. Alternatively, the tag classifier 312 can include selection functionality that automatically prioritizes and selects the tag for associating with the blog posting data 402.

The accuracy of the classifier 312 can directly impact the effectiveness of the tagging process. For improved accuracy, the classifier 312 should be representative of the correct usage of tags in the folksonomy defined by network (e.g., Internet) content. The system 300 can also include a mechanism to ensure this by training the tag classification model 314.

Figure 5:
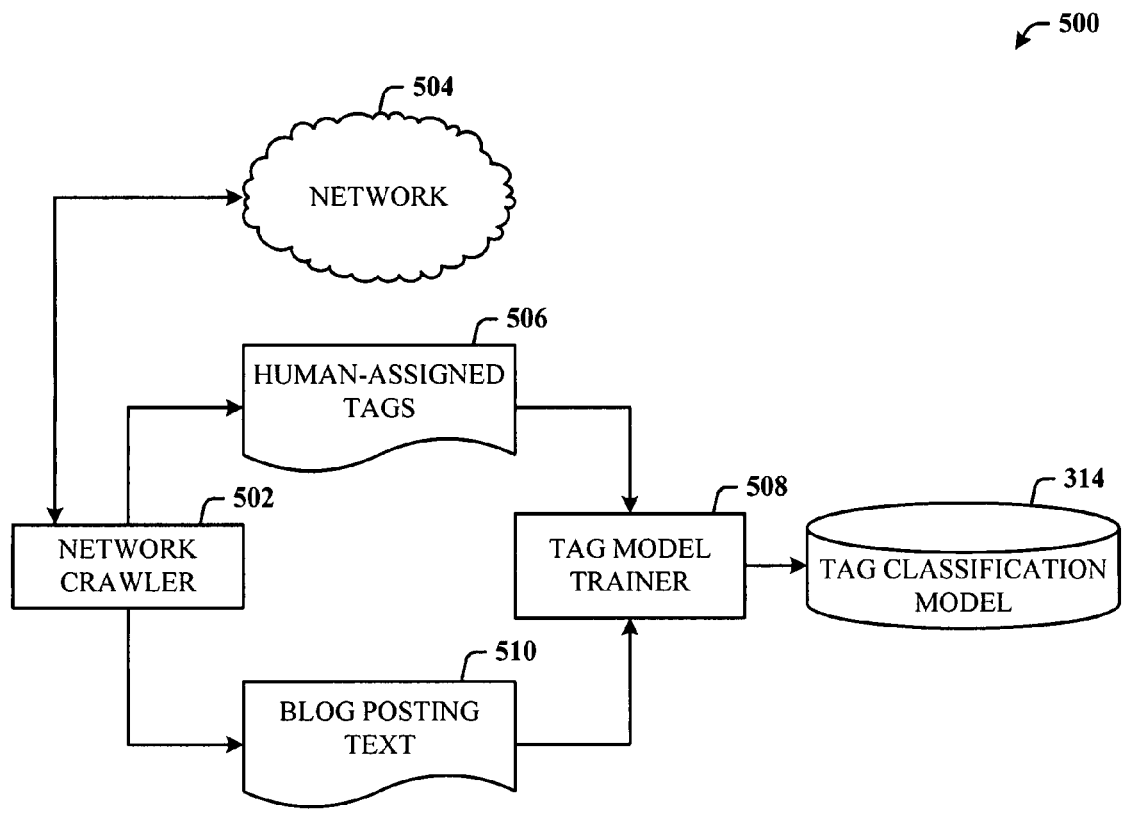
FIG. 5 illustrates a tagging system that employs a crawler to locate textual context from network entities for training of a tag model.

FIG. 5 illustrates a tagging system 500 that employs a crawler 502 to locate textual context from network entities for training of a model. The system 500 can employ the network (e.g., Internet) crawler 502 to locate textual content of a network 504 that has already been tagged. For example, the textual content can include human-assigned tags 506 obtained by and forwarded from the network crawler 502 to a tag model trainer 508, as well as blog posting text 510 obtained by and forwarded from the network crawler 502 to the tag model trainer 508. The text 510 and the corresponding tags 506 are fed into the tag model trainer process 508, which updates the tag classification model 314. Conventional Internet crawling and classification model training techniques can be employed, as are well-known by one skilled in the art.

Another input to the tag model trainer 508 can be the source data of the content (506 and 510), as provided by the crawler 502, since the classifier should ideally also be representative of local variations in tagging across the Internet. The source data can include the URL of the content, author, industry, for example, as well as other information that will aid in tagging the content. The source data can be obtained via the crawler 502, and passed to the trainer 508 along with the corresponding human-assigned tags 506 and the blog posting text 510, for example. In other words, the URL address, author data, industry information and/or other source data associated with the blog can be communicated to the trainer 508 as part of the blog posting text 510. The source data can be processed as an input with respect to any data input described herein.

Figure 6:
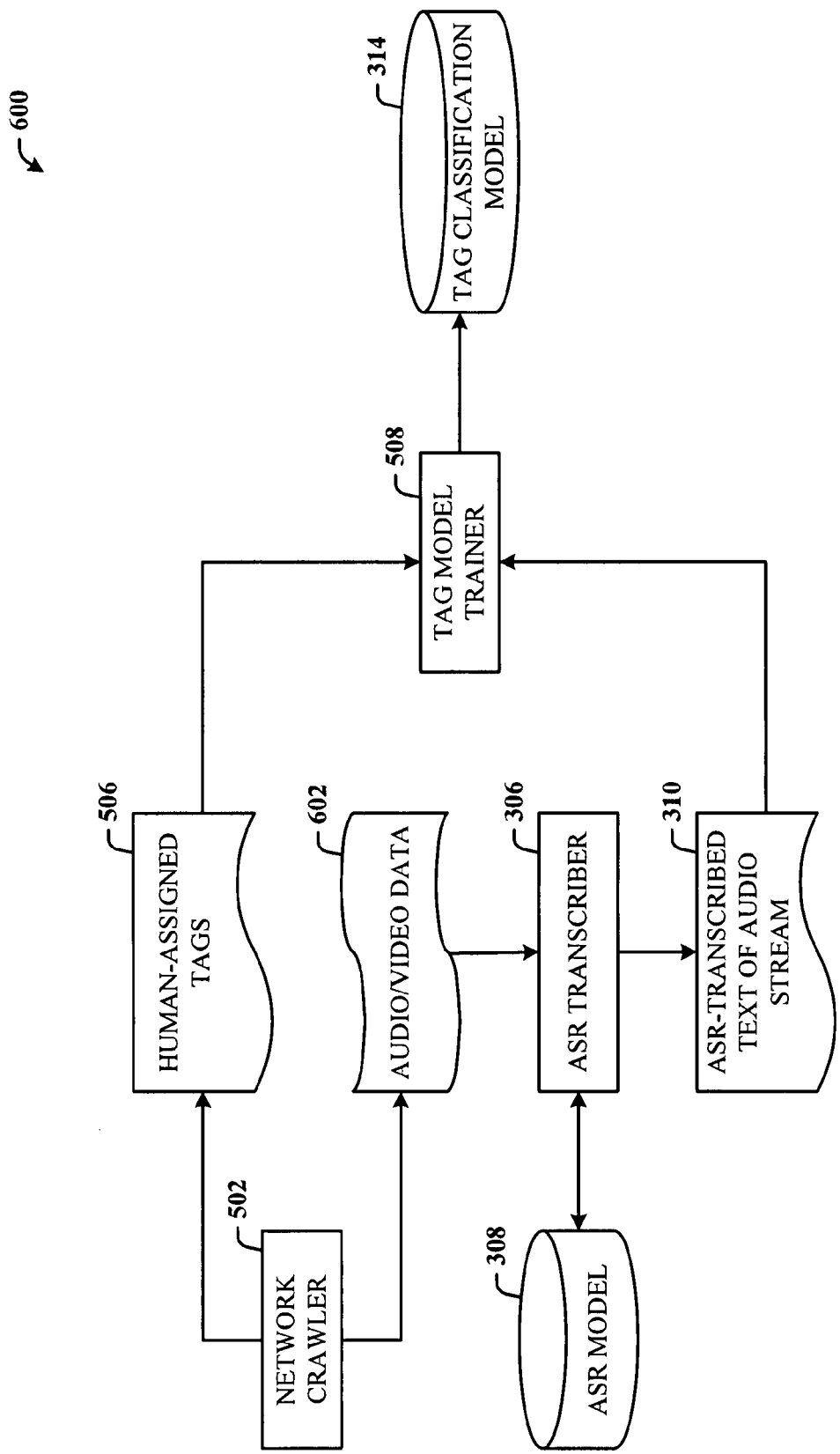
FIG. 6 illustrates a system where tagged audio data is employed for tag model training.

FIG. 6 illustrates a system 600 where tagged audio data is employed for tag model training. The crawler 502 can also search for untagged audio/video data 602. In this case, the network crawler 502 obtains the human assigned tags 506 and audio and/or video data 602. The human assigned tag data 506 is passed directly to the tag model trainer 508. The audio portion of the audio/video data 602 is passed to the ASR transcriber 306, which employs the ASR model 308 to process the audio portion of the data 602 into ASR-transcribed text 310. The text 310 is then passed to the tag model trainer 508. Both the human-assigned tag information and the transcribed text 310 are then used to train the tag classification model 314. Since the ASR transcription process 306 can, at times, be less than optimum, other inputs to the trainer 508 can be utilized to assign less weight to the text 310 when training the classification model 314.

Figure 7:
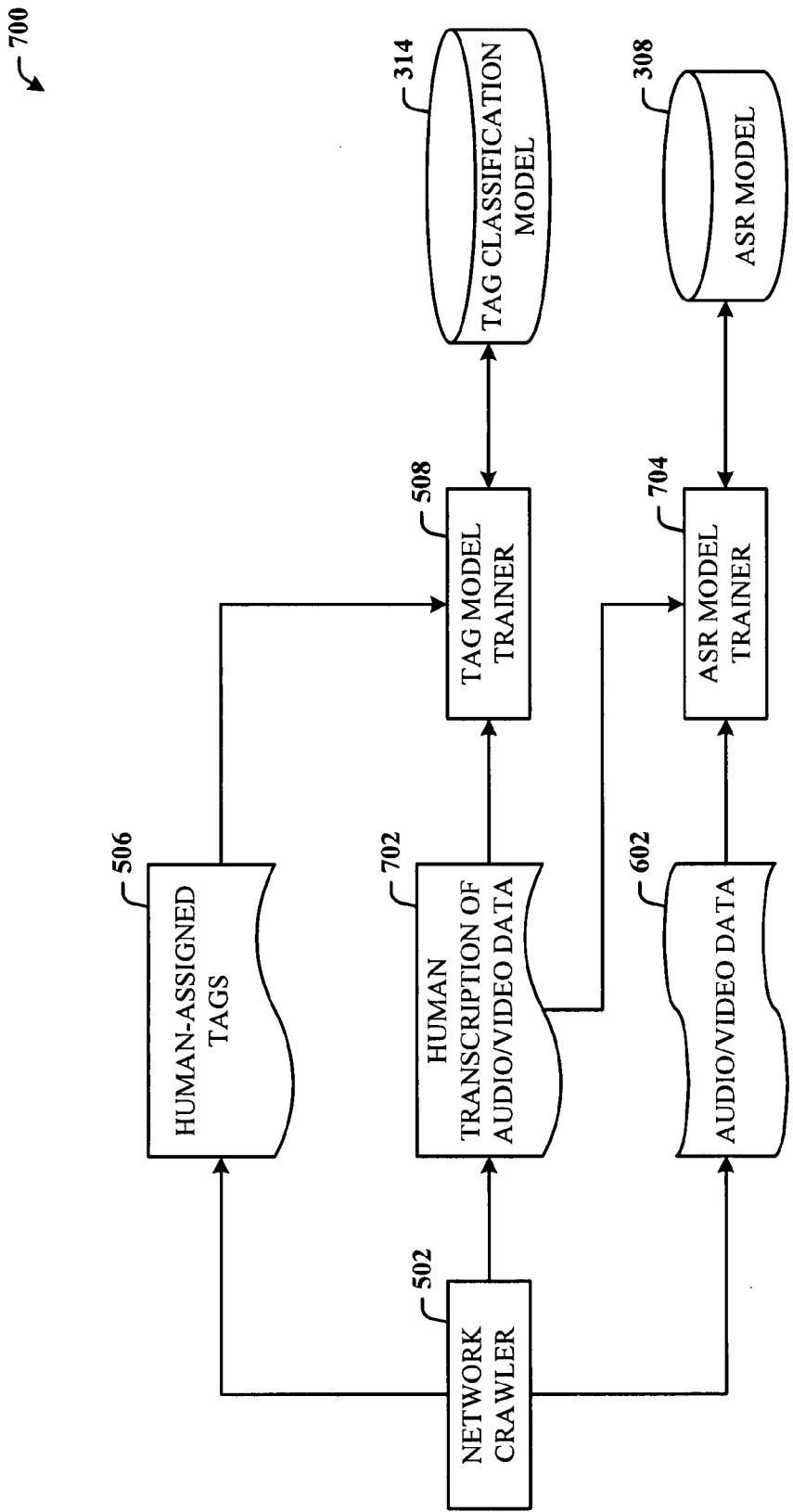
FIG. 7 illustrates a system for using transcribed and tagged audio to train classification and ASR models.

FIG. 7 illustrates a system 700 for using transcribed and tagged audio to train classification and ASR models. Here, the system 700 includes the crawler 502 that searches a network (e.g., network 504 of FIG. 5) for the human-assigned tags 506, audio and/or video data 602, and additionally, human transcribed audio/video data 702. The human-assigned tags 506 and human-transcribed audio portion of the data 702 are passed to the tag model trainer 508 for training of the tag classification model 314. The human-transcribed audio portion of the data 702 and the untagged audio/video data 602 are passed to the ASR model trainer 704 for processing and training of the ASR model 308 to improve the language and acoustic models. In other words, it is a desirable circumstance where the crawler 502 searches and finds audio/video content that not only has tags already assigned, but also, already has a textual transcription.

As with the tag classifier 312 of FIG. 3, the ASR model trainer 704 can also take into account the source of the content. For example, audio content from specific authors or sites may predominantly use the same set of speakers, and hence, speaker dependent characteristics can be incorporated into the ASR model 308. Conventional techniques for the training of acoustic and language models can be employed in the system 700.

Figure 8:
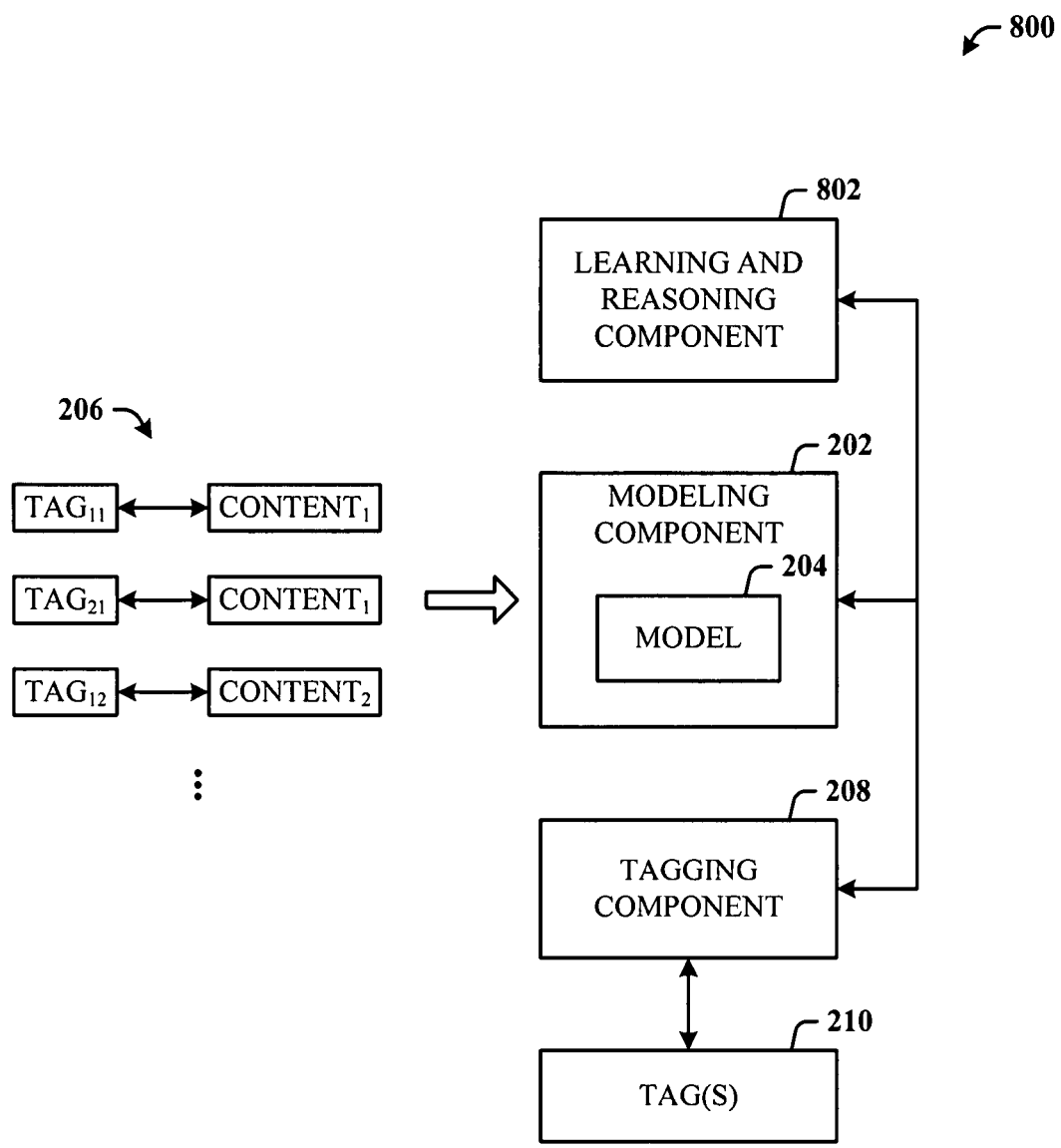
FIG. 8 illustrates a system that employs a machine learning and reasoning (LR) component which facilitates automating one or more features of the modeling and tagging architecture.

FIG. 8 illustrates a system 800 that employs a machine learning and reasoning (LR) component 802 which facilitates automating one or more features of the modeling and tagging architecture. The subject architecture (e.g., in connection with selection) can employ various LR-based schemes for carrying out various aspects thereof. For example, a process for determining which existing tagged data to select and/or which websites (or blogs, for example) can be facilitated via an automatic classifier system and process.

A classifier is a function that maps an input attribute vector, x=(x1, x2, x3, x4, xn), to a class label class(x). The classifier can also output a confidence that the input belongs to a class, that is, f(x)=confidence (class(x)). Such classification can employ a probabilistic and/or other statistical analysis (e.g., one factoring into the analysis utilities and costs to maximize the expected value to one or more people) to prognose or infer an action that a user desires to be automatically performed.

As used herein, terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, for example, various forms of statistical regression, naïve Bayes, Bayesian networks, decision trees, neural networks, fuzzy logic models, and other statistical classification models representing different patterns of independence can be employed. Classification as used herein also is inclusive of methods used to assign rank and/or priority.

As will be readily appreciated from the subject specification, the subject architecture can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be employed to automatically learn and perform a number of functions according to predetermined criteria.

The learning and reasoning component 802, as shown in general use with the system 200 of FIG. 2, can be employed to learn and reason about different aspects of one or more of the previously-disclosed systems 200, 300, 400, 500, 600, 700 and 800, for example. In other words, the learning and reasoning component 802 can be employed in FIG. 3 to interface to one or more of the ASR transcriber 306 to analyze the data 304 and quality of the transcribed text 310, the ASR model 308 to sample and/or analyze ASR model 308 processes and data, the tag classification model 314 for analysis of tag classification processes and data, the tag classifier 312 to analyze classification processes, and the tag list 316 to further analyze the "quality" of the output of the classifier 312.

Similarly, in FIG. 4, the learning and reasoning component 802 can further interface to one or more of the inputs and/or outputs of the tag classifier 312 to monitor, analyze, and modify classifier 312 and model 314 processes based on the non-tagged blog posting 402.

In FIG. 5, the learning and reasoning component 802 can interface to one or more of the inputs and/or outputs of the network crawler 502, the network 504, the tag model trainer 508, and the tag model 314 to monitor, analyze, and modify processes associated therewith.

In FIG. 6, the learning and reasoning component 802 can interface to one or more of the inputs and/or outputs of the network crawler 502, the inputs and/or outputs of the ASR transcriber 306, the inputs and/or outputs of the tag model trainer 408, and one or more of the models (308 or/and 314).

In FIG. 7, the learning and reasoning component 802 can interface to one or more of the inputs and/or outputs of the network crawler 502, the inputs and/or outputs of the tag model trainer 508, the inputs and/or outputs of the ASR model trainer 704, and one or more of the models (308 or/and 314).

In another implementation, the learning and reasoning component 802 can control the network crawler 502 to search sites (e.g., web sites, blogs, etc.) that are learned to provide tagging information of a higher quality than other sites previously searched. The quality can be based on the amount of human interaction involved after automatically providing the tag lists, for example. If it is learned that the user frequently selects tags that are generated based on information of a site or group of sites, the crawler can be controlled to search those sites more frequently.

Figure 9:
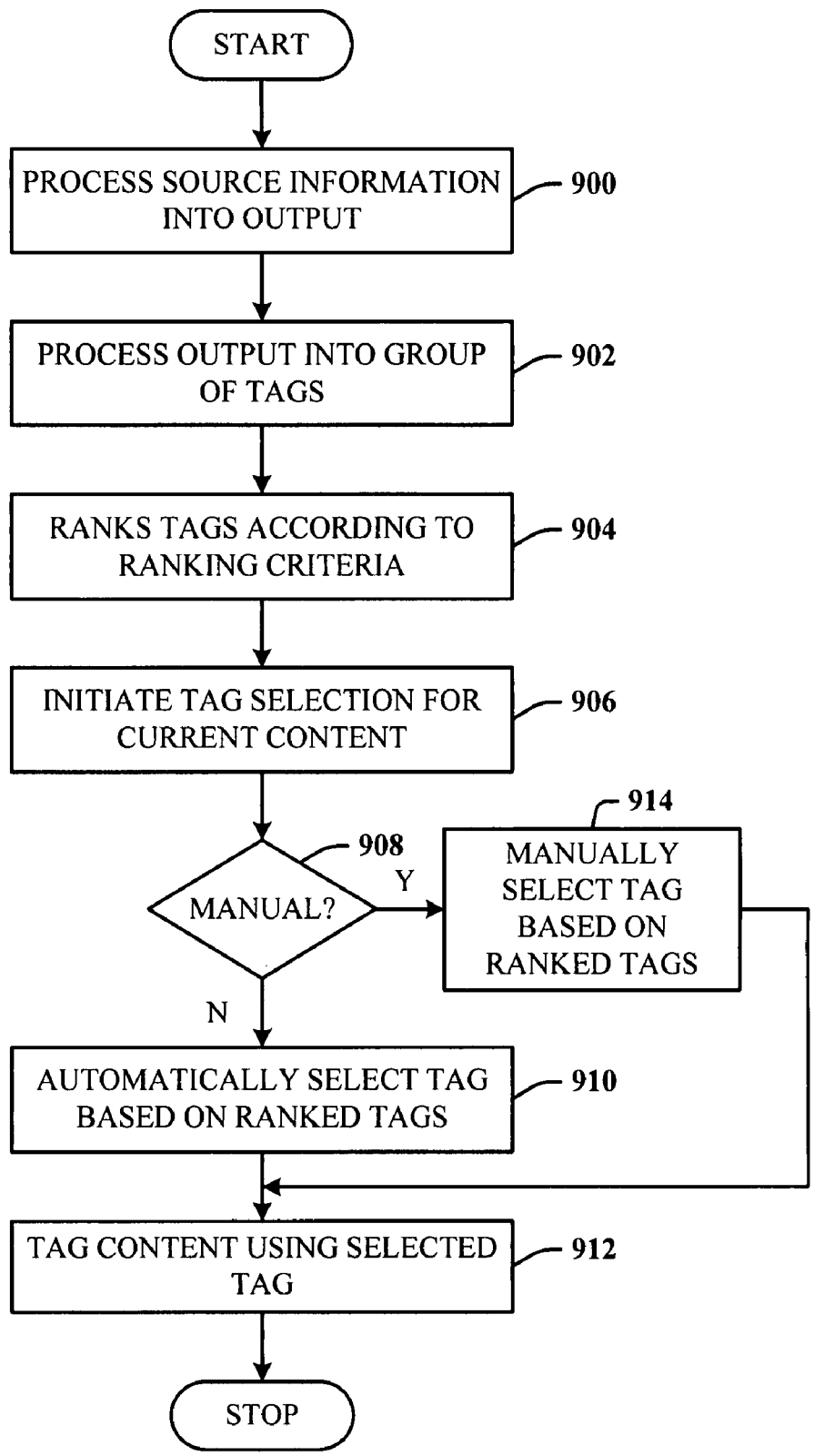
FIG. 9 illustrates a method of ranking and selecting tags.

FIG. 9 illustrates a method of ranking and selecting tags. At 900, source information is received and processed into output data based on searched information sources (e.g., web sites, blogs, forums, etc.). This can be a manual and/or automated process. At 902, the output is processed in a group or listing of tags. At 904, the group or listing of tags is then ranked according to criteria, which can be based on predetermined criteria or automatically derived criteria (e.g., using the learning and reasoning component 802). At 906, tag selection from the list or group for the current content is initiated. At 908, the system checks the mode of selection. At 910, if not manual (automatic), flow is to 910 to automatically select the tag from the list. At 912, the selected tag is then assigned to (or associated with) the content. Alternatively, at 908, if not selected automatically, but manually, flow is from 908 to 914 to manually select the tag based on the ranked list. Flow is then to 912 to tag the content. It is to be appreciated that the selectors (e.g., user, software) need not select the first-ranked tag, but can select a lesser-ranked tag.

Figure 10:
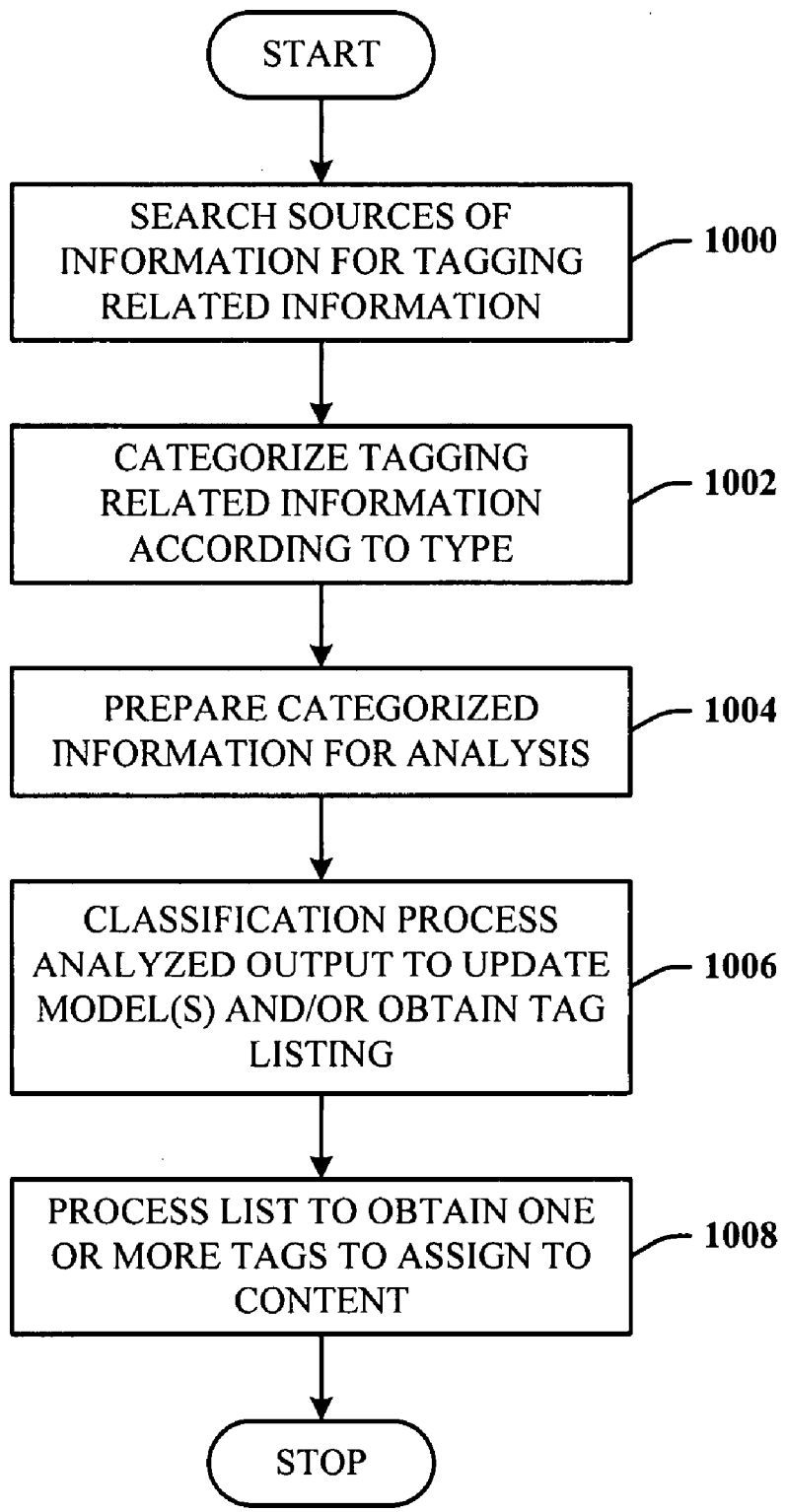
FIG. 10 illustrates a method of processing source information of various types in furtherance of generating a tag for new content.

FIG. 10 illustrates a method of processing source information of various types in furtherance of generating a tag for new content. At 1000, sources of information (e.g., web sites, blog sites, information servers, computing devices, smart phones, databases, . . . ) are searched for tagging related information. At 1002, categorize the information according to type. This can be textual, audio, image and/or video, for example. Moreover, the textual information can be in many different formats. For example, textual information can be raw text as presented on a web page, text scanned and obtained from source code underlying a web page, e-mail messages, XML (extensible markup language) text, program code, and so on.

At 1004, the categorized information is prepared for analysis. For example, textual data can be processed directly for content. Audio data can be recognized and translated into text for processing, and image data can be image processed according to conventional image processing techniques and annotated (e.g., manually, automatically), for example, as to the information depicted. Video data can be processed to separate the audio portion from the video portion, and the audio portion processed as previously described. A single frame or groups of frames of the video can be processed and annotated, as described above, and according to convention video and image processing technologies. At 1006, the analyzed output can be classification processed in order to update a classification model, and/or to utilize the existing state of the model to classify and obtain a listing of tags for selection. At 1008, the list is processed (e.g., automatically, manually) to obtain one or more tags to assign to the content.

Figure 11:
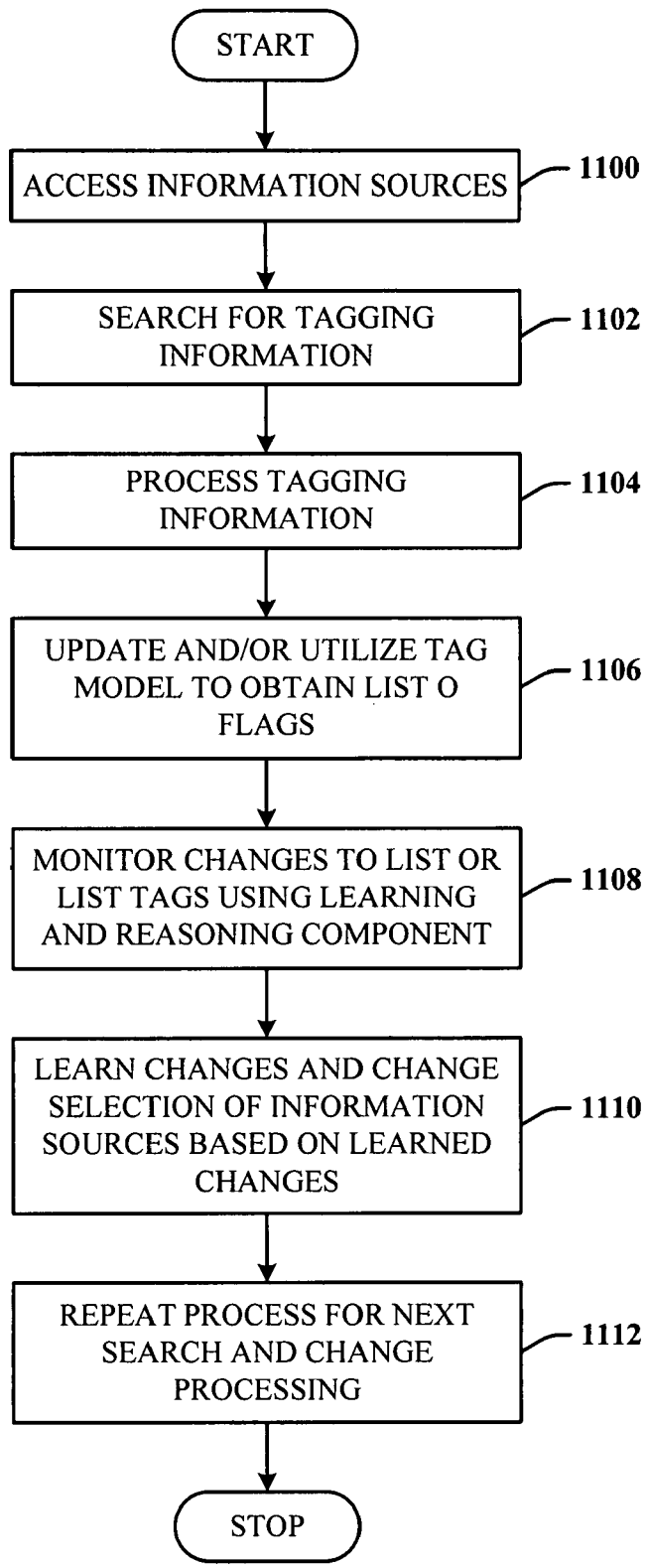
FIG. 11 illustrates a method of selecting information sources based on learning and reasoning processing.

FIG. 11 illustrates a method of selecting information sources based on learning and reasoning processing. At 1100, information sources (e.g., network-based, device-based) are accessed (e.g., via a crawler algorithm). At 1102, tagging information (e.g., human-tagged content, untagged information) is searched and received. At 1104, the tagging information is processed (e.g., for classification, for learning and reasoning). At 1106, a tag model is updated and/or utilized to obtain a list of tags for selection. At 1108, based on interaction with the list of tags, whether direct interaction with the list or changes to initial selection thereafter, the learning and reasoning component monitors these changes. At 1110, the changes are learned, and the learning and reasoning component changes the information sources to be selected for future searches based on the learned changes. At 1112, the process is repeated for the next processes.

Figure 12:
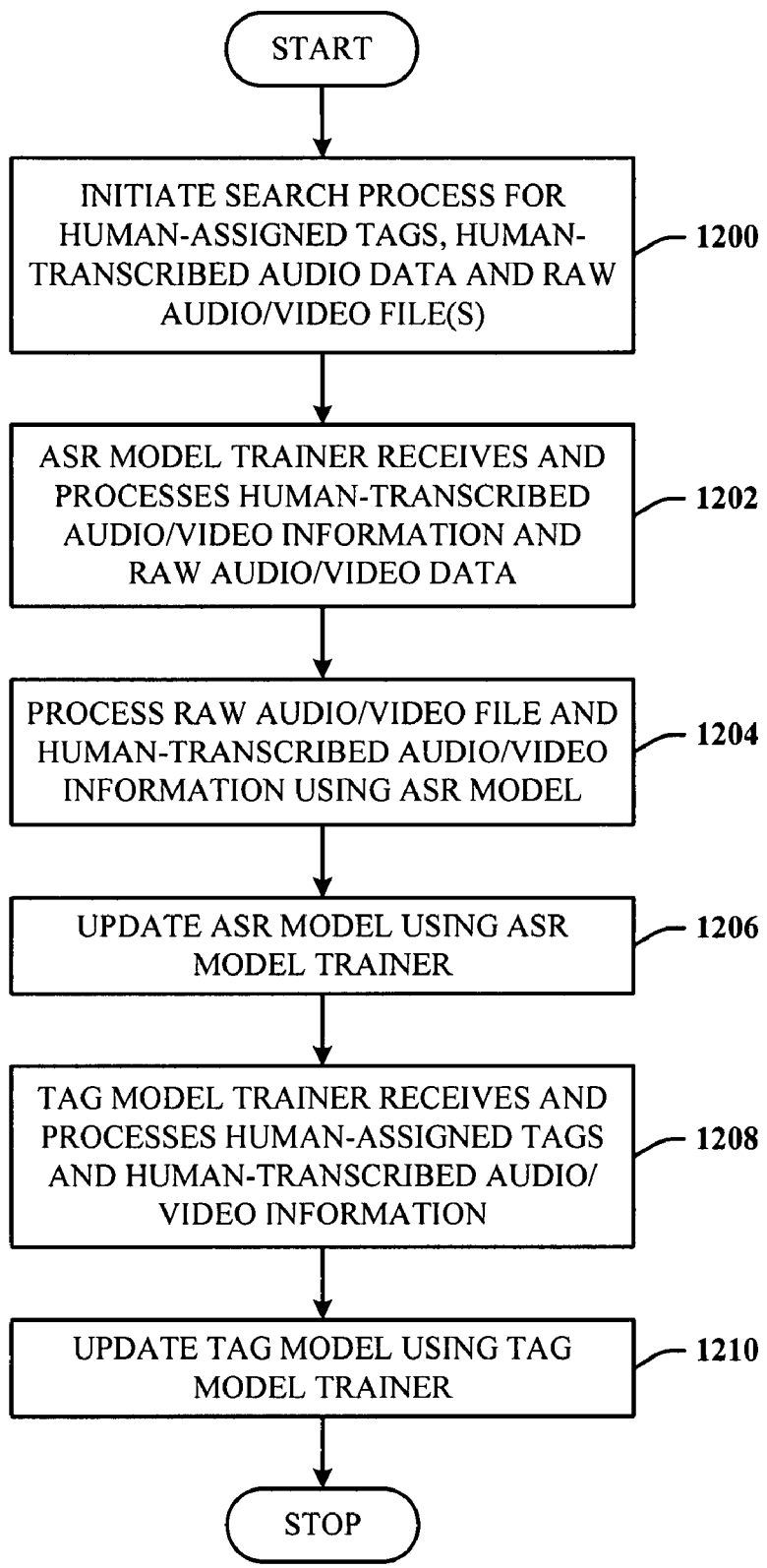
FIG. 12 illustrates a method of processing different types of information for tagging content.

FIG. 12 illustrates a method of processing different types of information for tagging content. At 1200, a search process is initiated for human-assigned tags, human-transcribed audio data, and raw audio and/or video file(s). At 1202, a model trainer receives and processes the human-assigned tags and human-transcribed audio and/or video information. At 1204, the audio and/or video file and the human-transcribed audio/video data is processed using an ASR model trainer. At 1206, the ASR model trainer updates an ASR model. At 1208, a tag model trainer receives the human-assigned tags and human-transcribed audio/video data. At 1210, the tag model trainer updates a tag classification model.

Figure 13:
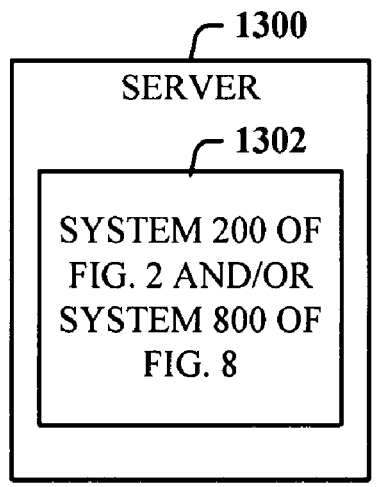
FIG. 13 illustrates a server that can employ the functionality provided by the system of FIG. 1 and/or the system of FIG. 7.

FIG. 13 illustrates a server 1300 that can employ the functionality provided by the system 200 of FIG. 2 and/or the system 800 of FIG. 8. A subsystem 1302 includes the functionality, which typically, will operate as a background process that is relatively transparent to other server processes. The subsystem 1302 can interface to the operating system and/or other applications that access and provide the desired data.

Figure 14:
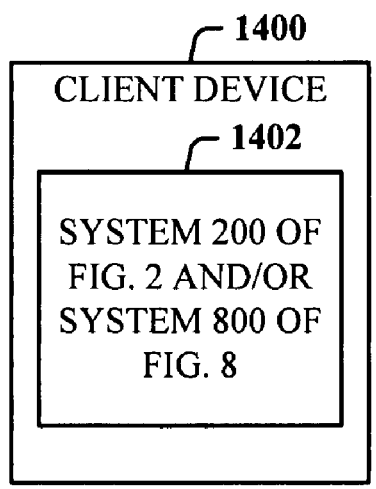
FIG. 14 illustrates a client device that can employ the functionality provided by the system of FIG. 2 and/or the system of FIG. 8.

FIG. 14 illustrates a client device 1400 that can employ the functionality provided by the system 200 of FIG. 2 and/or the system 800 of FIG. 8. A subsystem 1402 includes the functionality, which typically, will operate as a background process that is transparent to the user. The subsystem 1402 can interface to the operating system and/or other applications that access and provide the desired data.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 15:
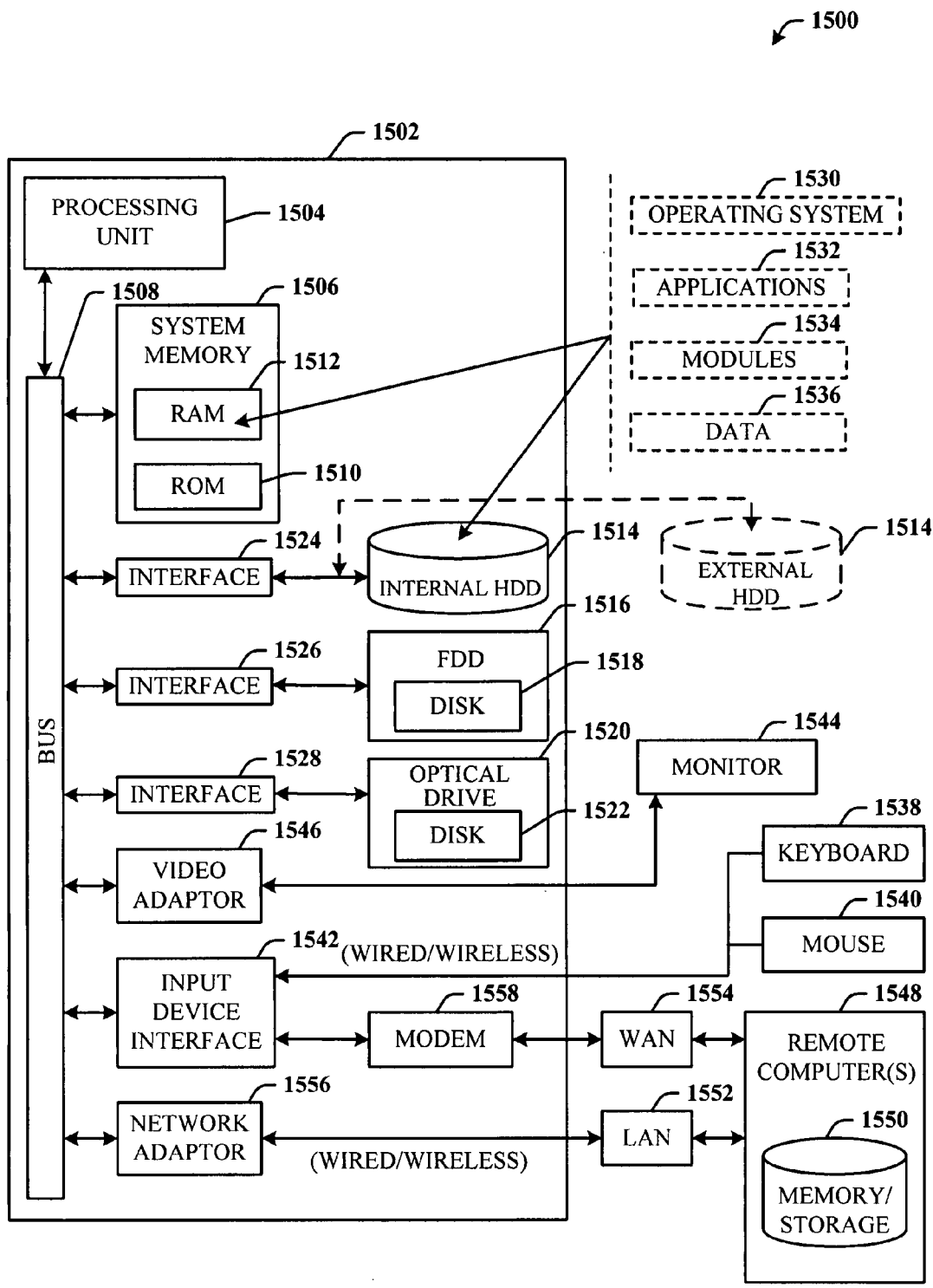
FIG. 15 illustrates a block diagram of a computing system operable to execute modeling and tagging in accordance with the disclosed architecture.

Referring now to FIG. 15, there is illustrated a block diagram of a computing system 1500 operable to execute tagging in accordance with the disclosed architecture. In order to provide additional context for various aspects thereof, FIG. 15 and the following discussion are intended to provide a brief, general description of a suitable computing system 1500 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 15, the exemplary computing system 1500 for implementing various aspects includes a computer 1502, the computer 1502 including a processing unit 1504, a system memory 1506 and a system bus 1508. The system bus 1508 provides an interface for system components including, but not limited to, the system memory 1506 to the processing unit 1504. The processing unit 1504 can be any of various commercially available processors. Dual microprocessors and other multi-processor architectures may also be employed as the processing unit 1504.

The system bus 1508 can be any of several types of bus structure that may further interconnect to a memory bus (with or without a memory controller), a peripheral bus, and a local bus using any of a variety of commercially available bus architectures. The system memory 1506 includes read-only memory (ROM) 1510 and random access memory (RAM) 1512. A basic input/output system (BIOS) is stored in a non-volatile memory 1510 such as ROM, EPROM, EEPROM, which BIOS contains the basic routines that help to transfer information between elements within the computer 1502, such as during start-up. The RAM 1512 can also include a high-speed RAM such as static RAM for caching data.

The computer 1502 further includes an internal hard disk drive (HDD) 1514 (e.g., EIDE, SATA), which internal hard disk drive 1514 may also be configured for external use in a suitable chassis (not shown), a magnetic floppy disk drive (FDD) 1516, (e.g., to read from or write to a removable diskette 1518) and an optical disk drive 1520, (e.g., reading a CD-ROM disk 1522 or, to read from or write to other high capacity optical media such as the DVD). The hard disk drive 1514, magnetic disk drive 1516 and optical disk drive 1520 can be connected to the system bus 1508 by a hard disk drive interface 1524, a magnetic disk drive interface 1526 and an optical drive interface 1528, respectively. The interface 1524 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1502, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed architecture.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. It is to be appreciated that the architecture can be implemented with various commercially available operating systems or combinations of operating systems. The applications 1532 and/or modules 1534 can include the components described supra in the figures, for example, the modeling component 202, tagging component 208, models (308 and 314), classifier 312, transcriber 306, and trainers (508 and 704).

A user can enter commands and information into the computer 1502 through one or more wired/wireless input devices, for example, a keyboard 1538 and a pointing device, such as a mouse 1540. Other input devices (not shown) may include a microphone, an IR remote control, a joystick, a game pad, a stylus pen, touch screen, or the like. These and other input devices are often connected to the processing unit 1504 through an input device interface 1542 that is coupled to the system bus 1508, but can be connected by other interfaces, such as a parallel port, an IEEE 1394 serial port, a game port, a USB port, an IR interface, etc.

A monitor 1544 or other type of display device is also connected to the system bus 1508 via an interface, such as a video adapter 1546. In addition to the monitor 1544, a computer typically includes other peripheral output devices (not shown), such as speakers, printers, etc.

The computer 1502 may operate in a networked environment using logical connections via wired and/or wireless communications to one or more remote computers, such as a remote computer(s) 1548. The remote computer(s) 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wired/wireless connectivity to a local area network (LAN) 1552 and/or larger networks, for example, a wide area network (WAN) 1554. Such LAN and WAN networking environments are commonplace in offices and companies, and facilitate enterprise-wide computer networks, such as intranets, all of which may connect to a global communications network, for example, the Internet.

When used in a LAN networking environment, the computer 1502 is connected to the local network 1552 through a wired and/or wireless communication network interface or adapter 1556. The adaptor 1556 may facilitate wired or wireless communication to the LAN 1552, which may also include a wireless access point disposed thereon for communicating with the wireless adaptor 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wired or wireless device, is connected to the system bus 1508 via the serial port interface 1542. In a networked environment, program modules depicted relative to the computer 1502, or portions thereof, can be stored in the remote memory/storage device 1550. It will be appreciated that the network connections shown are exemplary and other means of establishing a communications link between the computers can be used.

The computer 1502 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, for example, computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Figure 16:
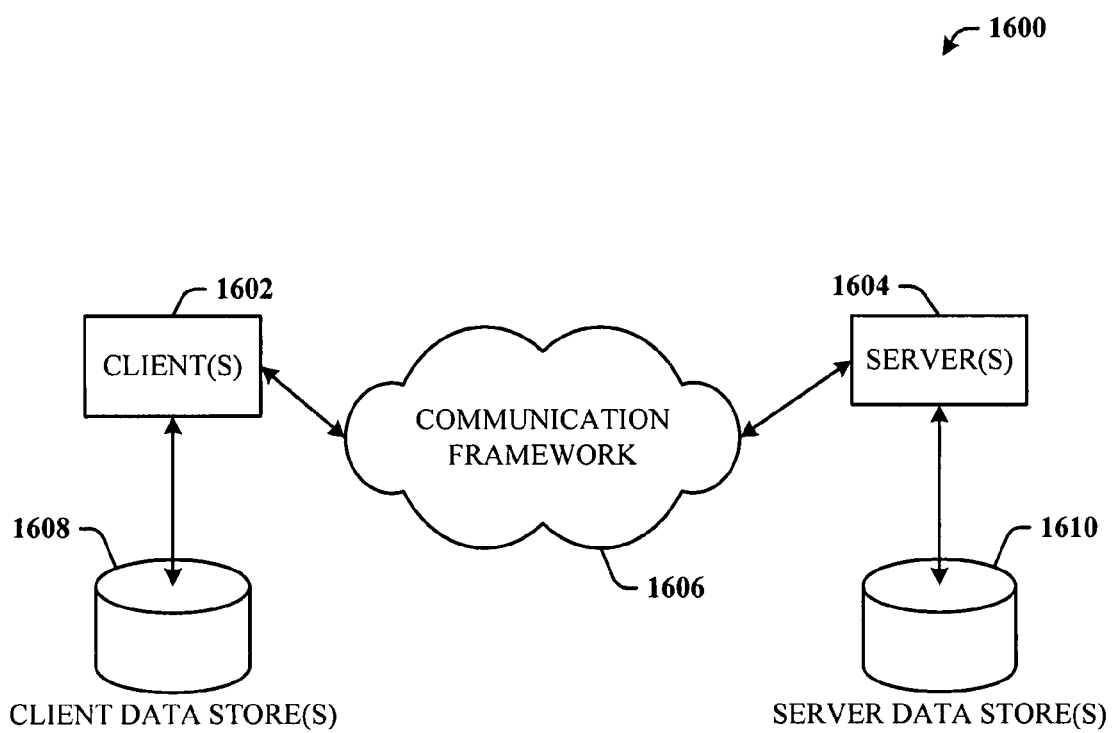
FIG. 16 illustrates a schematic block diagram of an exemplary computing environment for content processing and tagging in accordance with the disclosed architecture.

Referring now to FIG. 16, there is illustrated a schematic block diagram of an exemplary computing environment 1600 for content processing and tagging in accordance with the disclosed architecture. The system 1600 includes one or more client(s) 1602. The client(s) 1602 can be hardware and/or software (e.g., threads, processes, computing devices). The client(s) 1602 can house cookie(s) and/or associated contextual information, for example.

The system 1600 also includes one or more server(s) 1604. The server(s) 1604 can also be hardware and/or software (e.g., threads, processes, computing devices). The servers 1604 can house threads to perform transformations by employing the architecture, for example. One possible communication between a client 1602 and a server 1604 can be in the form of a data packet adapted to be transmitted between two or more computer processes. The data packet may include a cookie and/or associated contextual information, for example. The system 1600 includes a communication framework 1606 (e.g., a global communication network such as the Internet) that can be employed to facilitate communications between the client(s) 1602 and the server(s) 1604.

Communications can be facilitated via a wired (including optical fiber) and/or wireless technology. The client(s) 1602 are operatively connected to one or more client data store(s) 1608 that can be employed to store information local to the client(s) 1602 (e.g., cookie(s) and/or associated contextual information). Similarly, the server(s) 1604 are operatively connected to one or more server data store(s) 1610 that can be employed to store information local to the servers 1604. The servers 1604 can employ the systems described supra, for example, the systems 200, 300, 400, et seq.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented method of managing information, comprising acts of:
    searching information sources containing audio data for tag and content relationship data;
    transcribing the audio data to produce transcribed text;
    creating a tag classification model based on the relationship data comprising taxonomy between tags and an associated corpus of tagged content to produce tag information;
    obtaining the tag information from the tag classification model and outputting the tag information as a short list of likely tags that have a likelihood of being appropriate and related to the transcribed text;
    selecting a tag that applies to the transcribed text based on the list of likely tags; and
    utilizing a processor that executes instructions stored in memory to perform at least one of the acts of searching, transcribing, creating, obtaining or selecting.

2. The method of claim 1, further comprising classifying text data from the information sources for creation of the tag classification model and generating the tag based on the tag classification model.

3. The method of claim 1, further comprising generating a ranked list of tags from which the tag is selected for the transcribed text.

4. The method of claim 3, further comprising automatically selecting the tag from the ranked list and assigning the tag to the transcribed text.

5. The method of claim 3, further comprising manually selecting the tag from the ranked list and assigning the tag to the transcribed text.

6. The method of claim 1, further comprising classifying text data from the information sources based on a confidence threshold processed by a classifier.

7. The method of claim 1, further comprising:
    accessing a speech model to transcribe the audio data from audio and/or video content; and
    training the speech model based on the audio and/or video content.

8. The method of claim 1, further comprising:
    training the tag classification model based on at least one of tagged content, transcribed untagged audio and/or video data, tagged audio and/or video data, or blog text; and
    generating a list of ranked tags for the new content based on folksonomy, as defined by the tag classification model.

9. A computer-implemented system, comprising:
    computer-implemented means for searching information sources for tag and content relationship data to produce transcribed text;
    computer-implemented means for creating a tag classification model based on the relationship data using web-based folksonomy in which tag authors are users of tagged content to produce tag information;
    computer-implemented means for obtaining the produced tag information from the tag classification model and outputting the produced tag information as a short list of likely tags;
    computer-implemented means for automatically prioritizing and selecting a tag that applies to the transcribed text based on the list of likely tags; and
    processor means that executes computer-executable instructions associated with at least one of the means for searching, creating, obtaining, or prioritizing and selecting.

10. The system of claim 9, wherein the means for creating a tag classification model comprises means for generating the tag classification model based on content that includes untagged audio data.

11. The system of claim 9, wherein the means for creating a tag classification model comprises means for generating the tag classification model based on content that includes untagged blog posting data.

12. The system of claim 9, wherein the means for creating a tag classification model comprises means for generating the tag classification model based on audio content associated with video data.

13. A computer-implemented system of information management executed by a processor, comprising:
    a search component for searching information sources containing audio data from which text is transcribed for tag and content relationship data;
    a tag classification model for producing tag information based on the relationship data comprising taxonomy between tags and an associated corpus of tagged content;
    a tag classifier for obtaining tag information from the produced tag information of the tag classification model and for applying at least one of probabilistic or statistical analysis to the transcribed text in order to classify the text for tagging, to implement a confidence threshold to reduce the likelihood of an inappropriate tag being selected for the transcribed text;
    a tag for new content based on the taxonomy employed in the tag classification model; and
    a processor that executes computer-executable instructions associated with at least one of the search component, the tag classification model, the tag classifier, or the tag.

14. The system of claim 13, wherein the search component comprises a network crawler for locating textual content from network entities and forwarding to a tag model trainer.

15. The system of claim 14, wherein the textual content comprises at least one of human-assigned tags or blog posting text.

16. The system of claim 14, further comprising source data of the textual content located by the network crawler, for forwarding to the tag model trainer.

17. The system of claim 13, further comprising an automatic speech recognition transcriber for producing the transcribed text from the audio data located by the search component, the transcribed text used as relationship data.

18. The system of claim 17, wherein the audio data comprises an audio portion of audio/video data.

19. The system of claim 13, further comprising a machine learning and reasoning component for automating at least one feature of modeling and tagging.

* * * * *